R. Dillon,
Cotton Press.
N° 5,451.   Patented Feb. 22, 1848.
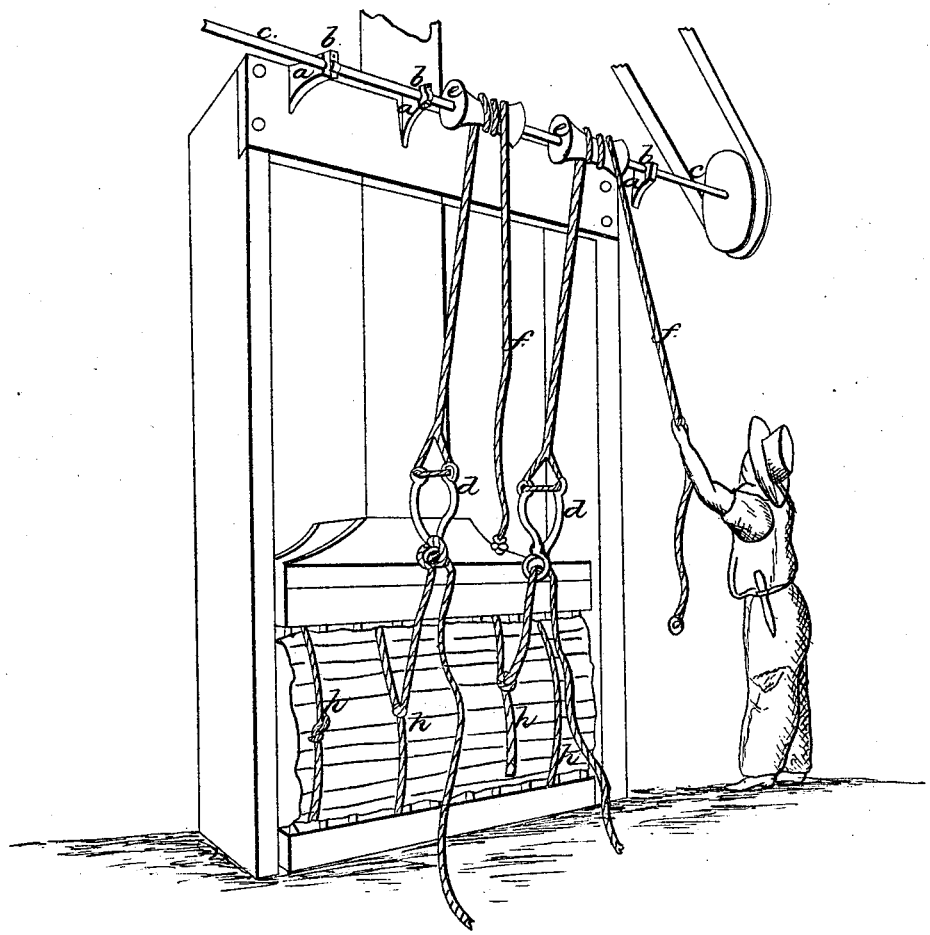

UNITED STATES PATENT OFFICE.

ROBERT DILLON, OF NEW YORK, N. Y.

IMPROVEMENT IN MACHINES FOR ROPING BALES OF GOODS.

Specification forming part of Letters Patent No. 5,451, dated February 22, 1848.

*To all whom it may concern:*

Be it known that I, ROBERT DILLON, of the city of New York, in the county and State of New York, have invented certain Improvements in Roping Bales of Goods; and I do hereby declare the following to be a full, clear, and exact description of the same, reference being had to the annexed drawing, making a part of this specification.

The nature of my invention consists in providing machinery to be operated by steam or other power as an aid in roping up bales of cotton and other goods.

To enable others to make and use my invention, I will describe its construction and operation.

I attach to the frame of the press or other substantial and suitable place a set of hangers of common construction $a$, and in the bearings thereof $b$, I place a shaft $c$, also of common construction, and further provide a set of pairs of tongs or pinchers $d\ d$, so constructed that when their handles are brought together their jaws will also be closed, and all of these I place in combination with the sheaves or concave centered pulleys $e\ e$ for the purpose of tightening up the ropes of the bales. The shaft is put in motion by a belt, there being a pulley to receive the same from the engine or other power.

The operation is as follows, viz: The shaft $c$ is set in motion by the belt, the rope $h$ and tongs $d$ being previously connected, and the rope $f$ having two or more turns around the sheave $e$. The end is passed to the hand of the operator, who has complete control over it, so that by tightening or slacking up the rope $f$ he may apply a greater or less degree of friction and tension or power at his discretion. The bales having been placed in the press in the usual way with the slack ropes $h\ h$ passed around them, the operator then applies the tongs to the bale-ropes $h$ and pulls one $f$ until the bale becomes perfectly tight and is fully pressed, when the rope $h$ is tied in the usual manner, and the operator takes up the next rope and repeats. This method of roping up bales differs in all respects from all other modes. Those most commonly in use are tackles and levers. The difficulty, however, is with all others as yet heretofore applied that no regular pressure can be depended upon; or, otherwise, that no two ropes are equally tight to any certainty. Now in my mode this is quite different. While these ample correctives overcome all evils here stated, as the precise amount of pressure can at once be felt by the operator—for instance, by the action of the pulley $e$ and the pressure of the rope by drawing it tight over the same pulley—the rope $h$ may be entirely strained apart or it may be drawn to a proper tension, or by slacking up the pulley $e$ will slide freely on the rope until the pressure is applied.

The advantages of this mode of roping up bales are materially important, inasmuch as one man will by the aid of this apparatus and power rope up a bale as soon as four men by the old process, and at the same time it has practically proved that one man will easier work fifteen hours than either of the four men would work twelve hours by the old lever process.

What I claim as my invention, and desire to secure by Letters Patent, is—

The peculiar combination of the sheaves $e\ e$ with the ropes and tongs applied for the purpose of roping-up bales of goods in the manner herein described.

ROBERT DILLON.

Witnesses:
J. L. KINGSLEY,
JOSEPH P. PIRSSON, Jr.